(12) United States Patent
Noy et al.

(10) Patent No.: US 7,765,283 B2
(45) Date of Patent: Jul. 27, 2010

(54) NETWORK PROVISIONING IN A DISTRIBUTED NETWORK MANAGEMENT ARCHITECTURE

(75) Inventors: Ariel Noy, Herzliya (IL); Yoel Shkolnisky, Or-Yehuda (IL); Gideon Stupp, Tel-Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 782 days.

(21) Appl. No.: 10/217,333

(22) Filed: Aug. 13, 2002

(65) Prior Publication Data

US 2003/0051049 A1    Mar. 13, 2003

Related U.S. Application Data

(60) Provisional application No. 60/312,080, filed on Aug. 15, 2001.

(51) Int. Cl.
G06F 15/177 (2006.01)
G06F 15/173 (2006.01)
H04M 1/24 (2006.01)
(52) U.S. Cl. .............. 709/220; 709/223; 379/15.03
(58) Field of Classification Search ............... 709/220, 709/223–224, 238, 241–244, 222, 226–228; 707/10; 379/15.03, 201.12
See application file for complete search history.

(56) References Cited

U.S. PATENT DOCUMENTS

| 4,965,719 | A |  | 10/1990 | Shoens et al. |
| 5,394,531 | A |  | 2/1995 | Smith |
| 5,832,503 | A |  | 11/1998 | Malik et al. |
| 5,835,757 | A | * | 11/1998 | Oulid-Aissa et al. .......... 707/10 |
| 6,041,350 | A | * | 3/2000 | Takimoto .................... 709/223 |
| 6,128,302 | A |  | 10/2000 | Kim et al. |
| 6,226,273 | B1 | * | 5/2001 | Busuioc et al. ............. 370/270 |
| 6,301,613 | B1 |  | 10/2001 | Ahlstrom et al. |
| 6,327,618 | B1 |  | 12/2001 | Ahlstrom et al. |
| 6,493,804 | B1 |  | 12/2002 | Soltis et al. |
| 6,601,082 | B1 |  | 7/2003 | Durham et al. |
| 6,651,191 | B1 |  | 11/2003 | Vacante et al. |
| 6,684,244 | B1 |  | 1/2004 | Goldman et al. |
| 6,760,761 | B1 |  | 7/2004 | Sciacca |
| 6,895,414 | B2 |  | 5/2005 | Ford et al. |

(Continued)

FOREIGN PATENT DOCUMENTS

WO    WO 95 15635    6/1995

OTHER PUBLICATIONS

Sakano, H. et al., "Approach for Integrated Operation and Management of Networks," NEC Research and Development, Nippon Electric ltd., Oct. 1998, pp. 528-533, vol. 39, No. 4, Tokyo, Japan.

*Primary Examiner*—Peling A Shaw
(74) *Attorney, Agent, or Firm*—Hickman Palermo Truong & Becker LLP (57) ABSTRACT

A method for provisioning a service request in a computer network, the method including a) determining a service path within a model of the computer network from a source device component within the model, the source device component corresponding to a first network device, to a destination device component within the model, the destination device component corresponding to a second network device, b) determining for each network device corresponding to device components along the service path the configuration operations required to provision the service request, and c) configuring each of the network devices.

12 Claims, 6 Drawing Sheets

U.S. PATENT DOCUMENTS

| | | |
|---|---|---|
| 7,103,616 B1 | 9/2006 | Harmer et al. |
| 7,233,975 B1 | 6/2007 | Gerraty et al. |
| 7,363,351 B1 | 4/2008 | Shafer |
| 7,523,097 B1 | 4/2009 | Wilson et al. |
| 7,558,835 B1 | 7/2009 | Shafer |
| 2003/0051008 A1 | 3/2003 | Gorthy et al. |
| 2005/0108387 A1 | 5/2005 | Li et al. |
| 2006/0080424 A1 | 4/2006 | Sun et al. |

* cited by examiner

Const:
    *Neigh*                      : the list of neighbor DCs of the current DC *u*;
    *W[1 . . . |Neigh|]*       : weights of outgoing links to neighbor DCs;
    *path*                        : path discovery request;
    *sig*                          : response signal;
    *fold*                         : path termination signal;

Var:
    *d*                            : destination DC
    *u*                            : current DC
    *v*                            : DC transmitting path discovery request to *u*;
    *cc*                          : counter for sent path discovery requests, integer init 0;
    *par*                        : parent DC, init undef;
    *dist2src*                 : weight from current DC to source DC, integer init $\infty$;
    *path2dst*               : list of DCs from current DC to *d*, init 0 (null);
    *len*                        : incoming weight from *v*;
    *result*                    : selected path between source DC and destination DC;

For the source DC only:
    1: *par* := *u*; *dist2src* := 0 ;
    2: for every *x* in *Neigh* do
            send <*path,W[x]*> to *x*; *cc* := *cc*+1;

Upon arrival of a <*path,len*> message from *v*:
    3: if *u=d* then send <*fold,d*> to *v*; send <*sig*> to *v*; break;     // reached destination
    4: if *par*=undef then *par* := *v*; *dis2src* := *len*; break;     // first message to *u*
    5: if *len* ≥ *dist2src* then send <*sig*> message to *v*; break;     // better route already found
    6: send <*sig*> message to *par*;
    7: *dist2src* := *len*; *par* := *v*;
    8: for every *x* in *Neigh* s.t. *x* ≠ *par* do
            send <*path,dist2src +W[x]*> message to *x*; *cc* := *cc*+1;

Upon arrival of a <*sig*> message:
    9: *cc* := *cc*-1;

Upon arrival of a <*fold,nodes*> message:
    10: if ||*nodes*|| < ||*path2dst*|| then *path2dst* := *nodes*;     // the ||*x*|| operator returns the weight of the weighted path *x*

Where {*cc* = 0 and *par* ≠ undef} :
    11: if *par* = *u* then *result* := *path2dst*; exit;     // source DC reached
    12: if *path2dst* ≠ ∅ then
            send <*fold,u · path2dst*> to *par*;     // · is the concatenation operator
    13: send <*sig*> to *par*; clear DC-level variables.

NETWORK PROVISIONING IN A DISTRIBUTED NETWORK MANAGEMENT ARCHITECTURE

CROSS-REFERENCE TO RELATED APPLICATIONS

This application is related to and claims priority from U.S. Provisional Patent Application No. 60/312,080 entitled "Network provisioning in an autonomous agent framework," filed Aug. 15, 2001, and incorporated herein by reference in its entirety.

FIELD OF THE INVENTION

The present invention relates to computer network management in general, and more particularly to network provisioning in a distributed network management architecture.

BACKGROUND OF THE INVENTION

Classic large-scale computer network architectures having hundreds or thousands of network elements, such as bridges, routers, and switches, are typically managed by a single, centralized network management server, which, by itself or possibly with the help of distributed data acquisition units, gathers information received from the network elements, through techniques such as polling or event trapping, in support of performing centralized functions such as determining the topology or operational status of the entire network or the root cause of network faults. Such centralized, hierarchical systems in which raw or formatted information is processed at a master server ultimately suffer from exhaustion of computation resources and poor response times. A necessary requirement of such centralized network management architectures is that the network management server "see" the entire network and thus be able to receive information from or regarding every element on the network and manage every such element as necessary. Other network management solutions that partition a network into multiple domains, with each domain being separately managed by a central server, do not offer a clear way of integrating cross-domain and end-to-end information, and are therefore not viewed as a full solution, or transform into a multi-hierarchy, centralized bottleneck.

Centralized network management systems suffer particularly when dealing with network provisioning. In classic network provisioning many different network devices are configured from a central location, which suffers from multi-element and multi-layer computation load and complexity, or are manually configured, which is inherently inefficient. This problem is compounded in partitioned systems, as each centralized server does not see the entire network, which may be critical in handling cross-partition provisioning tasks. Moreover, as the number and complexity of network elements increases, and as provisioning procedures grow increasingly complex as the network diversifies, the central network management server will ultimately fail as its capacity to receive and process information from all network elements is exceeded.

SUMMARY OF THE INVENTION

The present invention seeks to provide a method for network provisioning in a distributed network management architecture. The distributed network management architecture includes a plurality of decentralized network management units, where each network management unit sees and is responsible for only a portion of the overall network. A software and/or hardware "agent" is defined for each network element, with each decentralized network management unit hosting those agents that correspond to the portion of the network for which the network management unit is responsible. Each agent in turn comprises a plurality of device components (DCs), with each DC modeling one or more physical and/or logical aspects of the network element, typically with each DC bound and scoped to cover functionality which is within a single network layer. Moreover, the set of DCs comprising the agent, form published, well-defined, and addressable interfaces of each agent, which may then be easily made known and addressable to other agents.

In one aspect of the present invention a method is provided for provisioning a service request in a computer network, the method including a) determining a service path within a model of the computer network from a source device component within the model, the source device component corresponding to a first network device, to a destination device component within the model, the destination device component corresponding to a second network device, b) determining for each network device corresponding to device components along the service path the configuration operations required to provision the service request, and c) configuring each of the network devices.

In another aspect of the present invention the determining and configuring steps are operative where the first and second network devices are the same network device.

In another aspect of the present invention a method is provided for path discovery in a distributed network management architecture, the method including a) sending from a device component within a model of a computer network to each of its neighboring device components via outgoing links a path discovery request and a source-to-current-DC cumulative weight, b) establishing at each device component receiving a path discovery request a parent device component as being the device component that sent the lowest source-to-current-DC cumulative weight to the device component receiving the path discovery request, c) sending a path termination signal and an identifier list from a device component to a device component from which the path discovery request was received, the identifier list identifying a destination-DC-to-current-DC path from a destination device component to the device component at which the path termination signal is received, and the destination-DC-to-current-DC path having a destination-DC-to-current-DC cumulative weight, d) establishing at each device component receiving the path termination signal a best-path candidate as being the path identified by the identifier list having the lowest destination-DC-to-current-DC cumulative weight, and e) establishing at the source device component the best path to the destination device component as the best-path candidate established by the source device component among all identifier lists received by the source device component.

In another aspect of the present invention the sending step a) includes sending where the source-to-current-DC cumulative weight is the weight of the outgoing link where the device component sending the path discovery request is a source device component.

In another aspect of the present invention the sending step a) includes sending where the source-to-current-DC cumulative weight is the sum of the lowest weight received by the device component sending the path discovery request and the weight of the outgoing link to the device component receiving the path discovery request where the device component sending the path discovery request is not the source device component.

In another aspect of the present invention the establishing step b) includes sending a response signal to the parent device component upon establishing a new parent device component.

In another aspect of the present invention the establishing step b) includes sending a response signal to the device component sending the path discovery request where the source-DC-to-current-DC cumulative weight received from the device component sending the path discovery request is not lower than the source-DC-to-current-DC cumulative weight received from the parent device component.

In another aspect of the present invention the sending step c) includes sending if the device component sending the path termination signal has received a number of response signals equal to the number of path discovery requests sent by the device component sending the path termination signal, and if the device component sending the path termination signal has established a best-path candidate.

In another aspect of the present invention the sending step c) includes sending once the destination device component receives the path discovery request.

In another aspect of the present invention a method is provided for network device configuration, the method including sending a prepare_to_commit notification to each of the device components that lie along a path within a model of a computer network, therewith indicating at least one configuration action, determining if each network device associated with each of the device components is able to carry out the configuration actions, sending a commit instruction to each of the device components to perform the configuration actions if all of the determinations are affirmative, and sending a rollback instruction to each of the device components if any of the notifications are negative.

In another aspect of the present invention the sending a rollback instruction step further includes the device components instructing their associated network devices to revert to their previous state upon receiving the rollback instruction.

In another aspect of the present invention the method further includes sending a rollback instruction to each of the device components if any of the notifications are not received within a predetermined time from sending the prepare_to_commit notification.

In another aspect of the present invention the determining step includes any of the device components instructing its associated network device to perform the configuration actions, saving the network device's state prior to performing the configuration actions, if the configuration succeeds, the network device notifying its associated device component of the success, and if the configuration does not succeed, the network device notifying its associated device component of the failure and the network device reverting back to its previous state.

In another aspect of the present invention the saving step includes saving the state in a memory of the network device.

In another aspect of the present invention the saving step includes saving the state in a memory of the device component.

In another aspect of the present invention the method further includes selecting a central coordinator within the model, where the sending steps are performed by the central coordinator.

In another aspect of the present invention the determining step includes notifying the central coordinator of the determination.

In another aspect of the present invention the method further includes selecting a central coordinator within the model, where the sending steps are performed by the central coordinator.

In another aspect of the present invention the method further includes selecting a central coordinator within the model, where the sending steps are performed by the central coordinator.

In another aspect of the present invention a system is provided for provisioning a service request in a computer network, the system including a) means for determining a service path within a model of the computer network from a source device component within the model, the source device component corresponding to a first network device, to a destination device component within the model, the destination device component corresponding to a second network device, b) means for determining for each network device corresponding to device components along the service path the configuration operations required to provision the service request, and c) means for configuring each of the network devices.

In another aspect of the present invention the determining and configuring means are operative where the first and second network devices are the same network device.

In another aspect of the present invention a system is provided for path discovery in a distributed network management architecture, the system including a) means for sending from a device component within a model of a computer network to each of its neighboring device components via outgoing links a path discovery request and a source-to-current-DC cumulative weight, b) means for establishing at each device component receiving a path discovery request a parent device component as being the device component that sent the lowest source-to-current-DC cumulative weight to the device component receiving the path discovery request, c) means for sending a path termination signal and an identifier list from a device component to a device component from which the path discovery request was received, the identifier list identifying a destination-DC-to-current-DC path from a destination device component to the device component at which the path termination signal is received, and the destination-DC-to-current-DC path having a destination-DC-to-current-DC cumulative weight, d) means for establishing at each device component receiving the path termination signal a best-path candidate as being the path identified by the identifier list having the lowest destination-DC-to-current-DC cumulative weight, and e) means for establishing at the source device component the best path to the destination device component as the best-path candidate established by the source device component among all identifier lists received by the source device component.

In another aspect of the present invention the sending means a) is operative to send where the source-to-current-DC cumulative weight is the weight of the outgoing link where the device component sending the path discovery request is a source device component.

In another aspect of the present invention the sending means a) is operative to send where the source-to-current-DC cumulative weight is the sum of the lowest weight received by the device component sending the path discovery request and the weight of the outgoing link to the device component receiving the path discovery request where the device component sending the path discovery request is not the source device component.

In another aspect of the present invention the establishing means b) is operative to send a response signal to the parent device component upon establishing a new parent device component.

In another aspect of the present invention the establishing means b) is operative to send a response signal to the device component sending the path discovery request where the source-DC-to-current-DC cumulative weight received from the device component sending the path discovery request is not lower than the source-DC-to-current-DC cumulative weight received from the parent device component.

In another aspect of the present invention the sending means c) is operative to send if the device component sending the path termination signal has received a number of response signals equal to the number of path discovery requests sent by the device component sending the path termination signal, and if the device component sending the path termination signal has established a best-path candidate.

In another aspect of the present invention the sending means c) is operative to send once the destination device component receives the path discovery request.

In another aspect of the present invention a system is provided for network device configuration, the system including means for sending a prepare_to_commit notification to each of the device components that lie along a path within a model of a computer network, therewith indicating at least one configuration action, means for determining if each network device associated with each of the device components is able to carry out the configuration actions, means for sending a commit instruction to each of the device components to perform the configuration actions if all of the determinations are affirmative, and means for sending a rollback instruction to each of the device components if any of the notifications are negative.

In another aspect of the present invention the means for sending a rollback instruction further includes means for causing the device components to instruct their associated network devices to revert to their previous state upon receiving the rollback instruction.

In another aspect of the present invention the system further includes means for sending a rollback instruction to each of the device components if any of the notifications are not received within a predetermined time from sending the prepare_to_commit notification.

In another aspect of the present invention the determining means includes means for causing any of the device components to instruct its associated network device to perform the configuration actions, means for saving the network device's state prior to performing the configuration actions, means for causing the network device to notify its associated device component of success if the configuration succeeds, and means for causing the network device to notify its associated device component of the failure and the network device to revert back to its previous state if the configuration does not succeed.

In another aspect of the present invention the saving means is operative to save the state in a memory of the network device.

In another aspect of the present invention the saving means is operative to save the state in a memory of the device component.

In another aspect of the present invention the system further includes a central coordinator within the model, and where the central coordinator includes the sending means.

In another aspect of the present invention the determining means includes means for notifying the central coordinator of the determination.

In another aspect of the present invention the system further includes a central coordinator within the model, and where the central coordinator includes the sending means.

In another aspect of the present invention the system further includes a central coordinator within the model, and where the central coordinator includes the sending means.

BRIEF DESCRIPTION OF THE DRAWINGS

The present invention will be understood and appreciated more fully from the following detailed description taken in conjunction with the appended drawings in which:

FIG. 5 is a pseudocode description of a method for path discovery in a distributed network management architecture, operative in accordance with a preferred embodiment of the present invention.

DETAILED DESCRIPTION OF PREFERRED EMBODIMENTS

Figure 1:
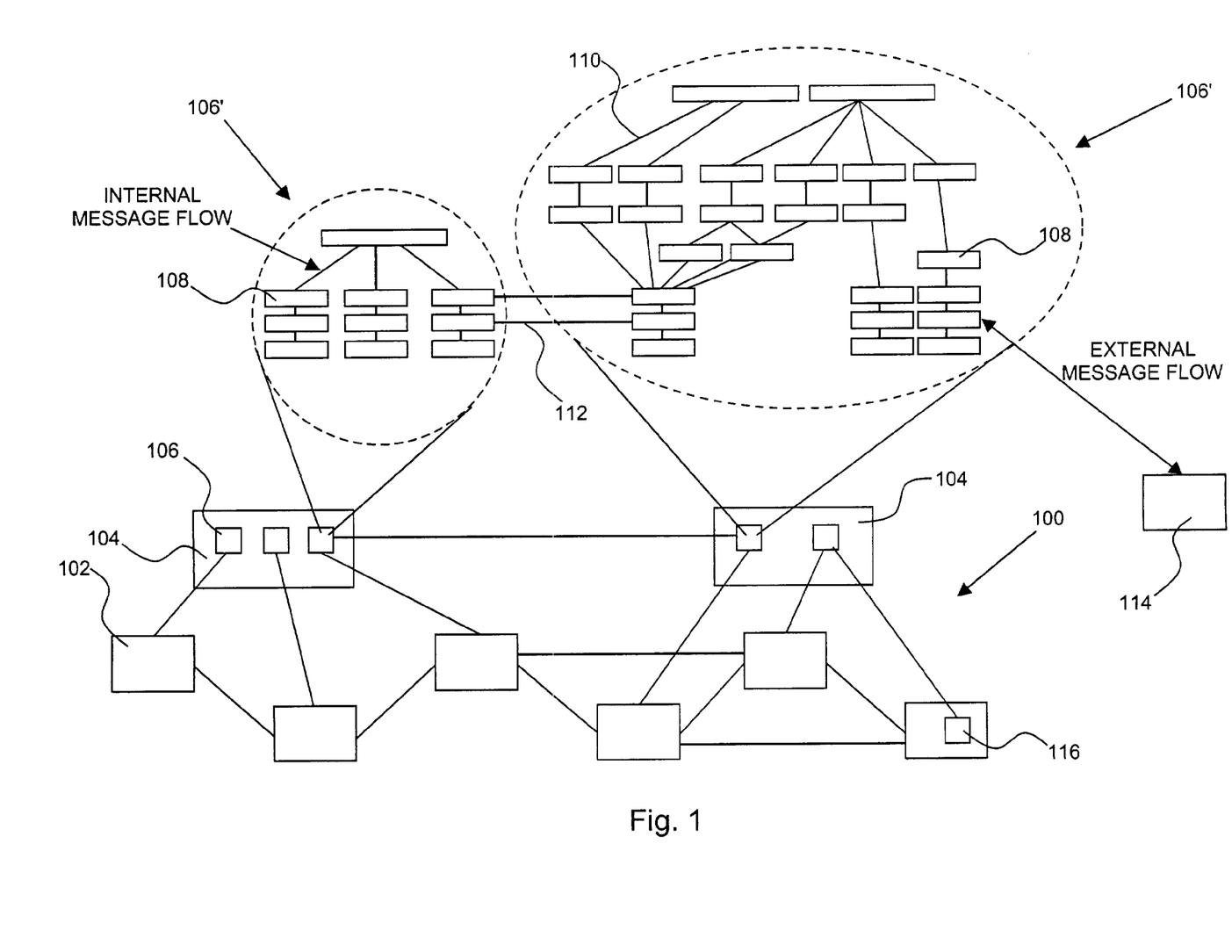
FIG. 1 is a simplified conceptual illustration of a large-scale network management system using distributed autonomous agents, useful in understanding the present invention.

Reference is now made to FIG. 1 which is a simplified conceptual illustration of a large-scale network management system using distributed autonomous agents, useful in understanding the present invention. In the system of FIG. 1 a network, generally designated 100, comprises a plurality of network elements 102, and is managed by one or more decentralized network management units 104, where each network management unit 104 sees and is responsible for only a portion of the overall network 100. A proxy or hardware embedded "agent" 106 is defined for each network element 102, with each decentralized network management unit 104 hosting those agents 106 that correspond to the portion of the network 100 for which the network management unit 104 is responsible. (Various agents 106 are shown in expanded views in dashed lines indicated by reference numerals 106'.)

Each agent 106 in turn comprises a plurality of device components (DCs) 108, with each DC 108 modeling one or more physical and/or logical aspects of the device 102, typically within a single network layer. For example, a DC 108 may represent an Ethernet port component, a 1483 encapsulation component, or routing functionality within a network element incorporating such functionality. DCs 108 may maintain any information concerning certain functions or aspects of the specific network element. This information may be static, dynamic, or any combination thereof. DCs 108 may communicate directly with other DCs 108, and two DCs 108 that communicate with each other are referred to as "neighbors." DCs 108 are typically arranged in a functional hierarchy within the agent 106, with a higher-level DC acting as the "parent" to one or more lower-level DC "children" with which it communicates, such as is shown at reference numeral 110. DCs that communicate with other DCs that are of the same type or perform the same function are referred to as "acquaintances," such as is shown at reference numeral 112. DCs may become "acquainted" by manually defining relationships between DCs or by having DCs send messages in order to discover topologically adjacent DCs. A DC 108 may be acquainted with another DC 108 within the same agent 106 or within another agent 106. Each DC 108 preferably uses message passing to independently communicate with any neighbor or adjacent DCs without the need to communicate directly with a centralized network management device.

DCs 108 may send/receive messages to/from neighbor DCs 108, to the network element 102 which the DC 108 models, or an external entity or device 114 (either logical or physical) that is not modeled by an agent or a DC. Information flows between DCs 108 are referred to as "internal" flows, while information flows between DCs 108 and external entities or devices 114 are referred to as "external flows". One example of an internal flow is where a device component detects a fault within its area of responsibility and reports the fault to neighboring DCs to whom such information is useful. One example of an external flow is as the result of a query of all DCs 108 in network 100 by logic external to the DCs 108 and/or the agents 106 for gathering the IP addresses of devices 102 where available. Upon receiving a message, a DC may ignore the message or may react by autonomously changing its physical or logical state and/or that of its corresponding area of functionality within the network device or send a message to itself or to a neighbor DC.

Additionally or alternatively to agents 106 being hosted by decentralized network management units 104, each network element 102 may itself host its agent and/or another device's autonomous agent, such as is shown at reference numeral 116. Thus, were each network element 102 to host its own agent, no decentralized network management units 104 would be required.

Figure 2:
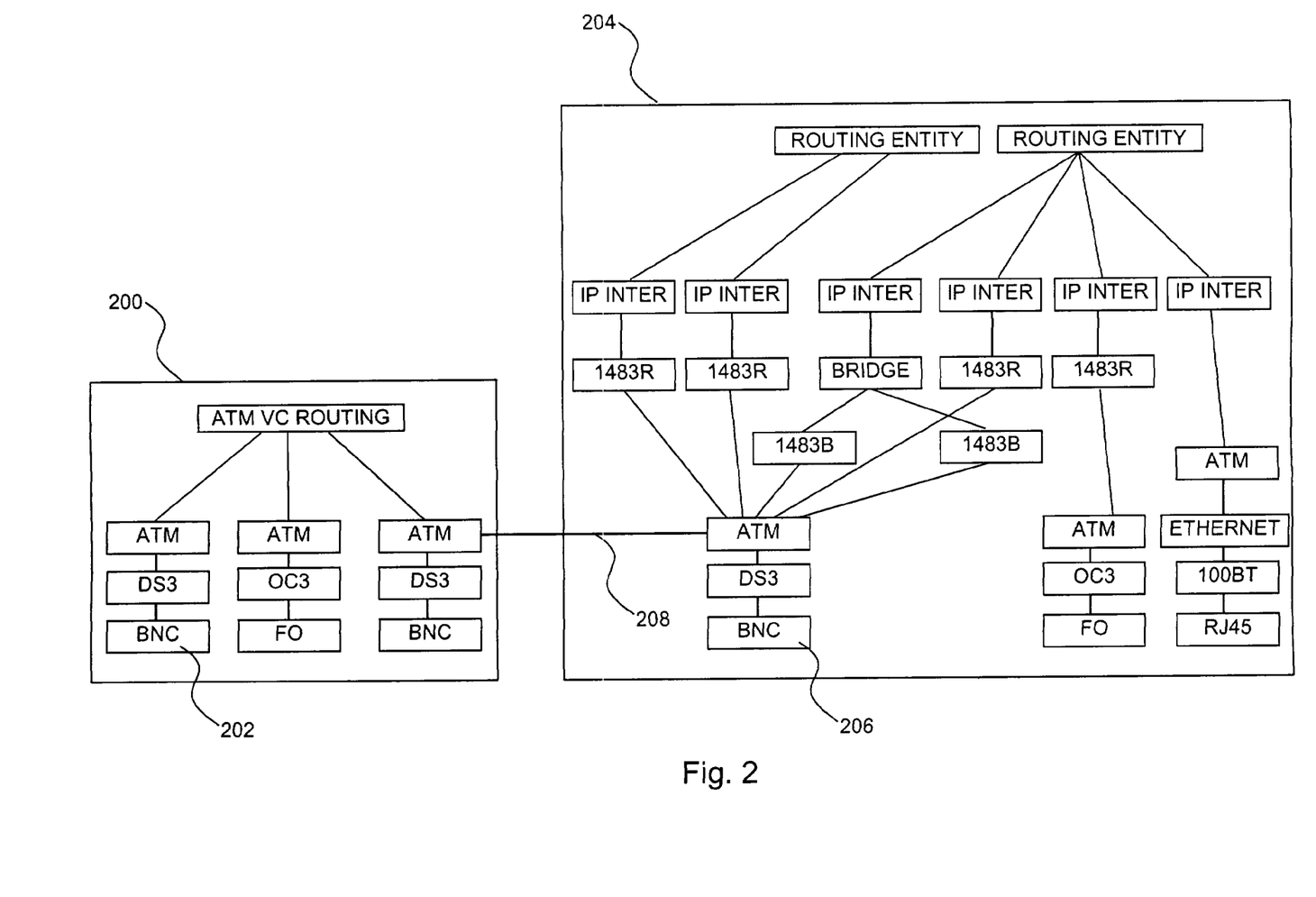
FIG. 2 is a simplified conceptual illustration of an exemplary agent and DC configuration, useful in understanding the present invention.

Reference is now made to FIG. 2 which is a simplified conceptual illustration of an exemplary agent and DC configuration, useful in understanding the present invention. In FIG. 2 an ATM switch having three ATM ports is modeled by an agent 200. Agent 200 in turn includes several DCs 202 as follows: two DCs corresponding to two BNC connectors, one DC corresponding to a fiber optic (FO) connector, two DC parents to the BNC DCs representing DS3 connectivity, one DC parent to the FO connector representing OC3 connectivity, three DCs representing the ATM network layer functionality for each of the three ATM ports, and a DC parent corresponding to the switch's ATM virtual channel (VC) routing functions. Also shown is an agent 204 having multiple DCs 206 corresponding to ATM and Ethernet connections and functionality at various network layers representing bridging, switching, and routing functions, including IP and 1483 interface protocols.

An ATM DC in FIG. 2 may, for example, maintain a list of all the VCs assigned to the ATM port it models, and may monitor the removal of a VC from the port or the allocation of a new VC to the port. An IP interface DC may, for example, contain the IP address of the physical IP interface of the device and subnet mask. Each type of DC may appear in several instances in one or more agents depending on the specific device and its configuration. Thus, in FIG. 2, since the network device represented by agent 200 has three ATM ports, agent 200 has three instances of an ATM-type DC.

The configuration of FIG. 2 may be adapted through continuous modeling to reflect the true state of the network at any given time. DCs and the links between them may be added or removed at runtime to reflect the current state of the network, allowing tracing of the data flows, states and reactions of the network. Changes in the underlying physical network may be dynamically reflected by the model by affecting the DCs and the connections between them in response to network events. For example, if a link is disconnected between two ATM ports in the network, a link 208 between the neighbor ATM DCs in agents 200 and 202 representing network layer 2 adjacency should be removed. When the link is reconnected, link 208 between the two ATM DCs may be restored.

By modeling the network elements in a computer network using interconnected agents through the DCs in them as shown in FIGS. 1 and 2, the network may be fully modeled at both the network element and network function levels. Furthermore, the model may be used to reflect at any given moment the current state of the network, with DCs autonomously supporting fault, configuration, accounting, performance, security, policy, and provisioning functions.

Figure 3:
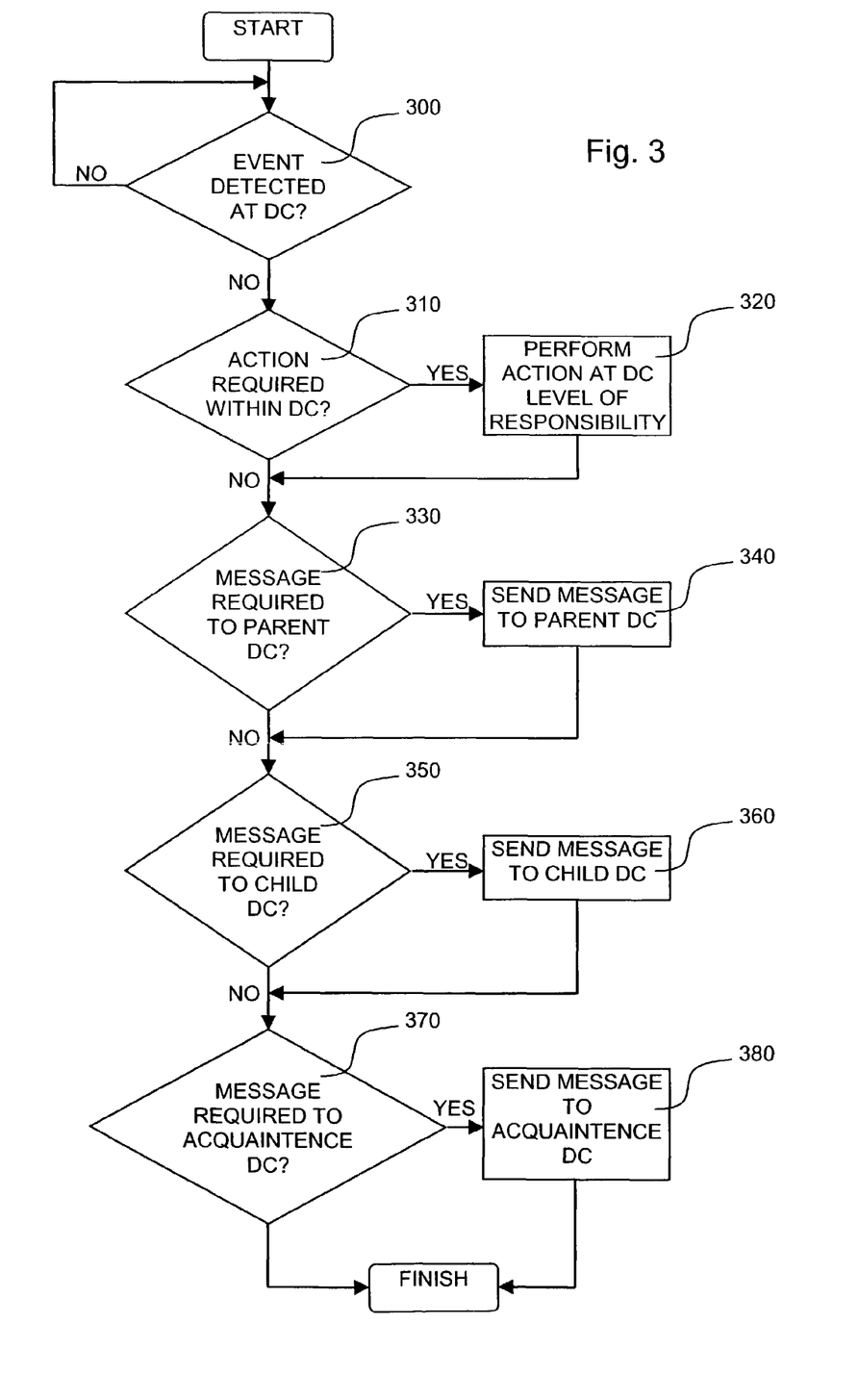
FIG. 3 is a simplified flowchart illustration of an exemplary decision-routing DC framework, useful in understanding the present invention.

Reference is now made to FIG. 3, which is a simplified flowchart illustration of an exemplary decision-routing DC framework, useful in understanding the present invention. In the method of FIG. 3 an event, such as a fault or a provisioning request, is detected at a DC (step 300). The DC then determines if it is to take any action in response to the event within the DC and/or its area of responsibility (step 310), and, if so, performs such action (step 320). The DC then determines if it is to send any messages to a parent DC (step 330), a child DC (step 350), and/or an acquaintance DC (step 370), and sends any required messages (steps 340, 360, and 380).

The concept of events and flows as described hereinabove with reference to FIGS. 1, 2, and 3, may be better understood by way of example. In what is referred to as a system-wide, top-down flow, a request arrives from an external entity and is spread from DC to DC, with each DC performing its independent computations which collectively achieve the external request. For example, the provisioning of a QoS parameter for a specific user class is signaled and synchronized for IP ToS masks between IP DCs of routers and is also carried by the routers' IP-over-ATM-interface DCs into the ATM DCs which signal and synchronize the ATM VBR parameters to the DCs of the ATM switches between the routers. In other words, for configuration of QoS between two IPs, the routers on the path between the two IPs may be configured with consistent ToS parameters. Moreover, the ATM path between every two consecutive routers in the layer 3 path may be configured with consistent VBR parameters. In a bottom-up flow, a network or DC event, including scheduled events, may propagate to other DCs which change their state and/or perform their part in a distributed algorithm. An example of such a flow is in fault detection. For example, an ATM circuit break is signaled by ATM DCs to both ends of the circuit. The signal is then propagated up the stack to IP DCs in routers whose IP-over-ATM-interface is affected by the break. The unreachable IP subnet failure is then correlated with the ATM circuit break point which initiated the flow.

An example of DC discrete message passing that provides multi-layer control signaling for use in end-to-end provisioning and fault isolation may be understood with reference to acquainted same-layer, same-technology DCs (e.g., two layer 2 ATM DCs, two layer 3 IP MPLS DCs, two Layer 5 H323 DCs, etc.) in neighboring agents representing different network elements as defined by that layer's standards. The two DCs may exchange discrete messages regarding configuration parameters, status monitoring, statistics, and accounting parameters of the layer interface as it is implemented in the two elements. Similarly, father-son DCs representing areas of responsibility in the same network element which maps functionality between upper and lower layers or functions as defined in networking standards and in the specific network element specifications (e.g., IP to Ethernet, ATM to DS3, SONET to DWDM, etc.) may exchange discrete messages regarding the way in which configuration parameters of the upper layer relate to the lower layer and visa versa (e.g., MTU, IP TOS to dot.p, etc.), regarding the way in which faults have an effect between layers (e.g., layer 2 link down, layer 3 unreachable subnet, etc.), and the way performance statistics affect the layers involved in such mapping.

It is appreciated that events and messaging of the distributed network management architecture of FIGS. 1-3 preferably adhere to networking standards. Thus, for example, two DCs on both sides of an interoperable logical link may signal each other the existence of a link failure (e.g., far-end near-end SONET) or agree on a constant configuration parameter (e.g., SONET/SDH VP/VC Mask, etc.). Similarly, parameters of an upper layer may be mapped to a lower layer in according with networking standards as deployed in the network elements, such as the way an IP switch chip is wired to an Ethernet MAC chip or the way IP software drives SONET hardware. The combination of such parent-child and acquaintance-acquaintance single-hop discrete message passing between DCs constitutes a powerful multi-layer signaling mechanism that can carry out end-to-end provisioning tasks and can deduce the root cause and the effect of a network condition.

The path that a message would take in a physical network that is modeled by the architecture described hereinabove with reference to FIGS. 1-3 may be determined within the context of the model itself prior to actual physical transmission, rather than by observing actual message traffic within the physical network. For example, a simulated network message including an information stack may be sent from a source DC to a destination DC in order to discover the path that such a message would take were it to be sent from a source network device corresponding to the source DC to a destination network device corresponding to the destination DC. The source and destination DCs may each represent a network model layer, a sublayer, or a functional entity of the corresponding network device such as an IP interface of the device or a VC of a specific port in the device. Each DC receiving the simulated message is configured with the information it needs to decide where a real message with the same characteristics would be forwarded. Each DC may also be configured to place information onto the information stack as may be needed by an intermediate DC along the message path to determine, in accordance with known network routing rules, which DC to forward the message to, and may be configured to use stack information for such purposes. For example, a DC corresponding to an ATM port within a network device may be configured to place onto the stack an identifier of the VC over which the message is to be transmitted, while a DC corresponding to an ATM routing entity may be configured to use the VC identifier from the stack to identify the outgoing VC that the incoming VC is routed to and replace the incoming VC on the stack with the outgoing VC. Similarly, a DC corresponding to a routing entity may look to the stack for the current destination DC, expressed as an IP address, calculate the next hop to this destination as well as the next DC along the path, and provide this information to the next DC. Thus, the information passed from a source DC to an above, below, or adjacent DC necessarily contains enough information from the source DC to calculate the next hop. This is in conformity with well-known networking rules, where as a packet is forwarded within the network the packet is inspected at each network node which uses information from the packet together with information local to the node to determine the next hop, without requiring any data external to the current network layer.

In general, before the network message can pass from a DC at a higher network layer to a DC at a lower network layer, the stack must contain whatever information that would normally be required for message passing between network layers within the physical network, since the stack describes a packet's behavior as it would travel within the physical network. For example, when an IP packet passes from layer 3 to layer 2, the data of layer 3 is wrapped (stacked) with the layer 2 data, and the layer 2 destination becomes the new destination. In the network, moving down a layer causes the packet to be wrapped in additional information. This corresponds to pushing information onto the stack in the context of the present invention. Moving up a layer removes the wrapping from the packet. This corresponds to removing information from the stack in the context of the present invention. As a lower layer of a network device does not alter information from the upper layers, so too does a DC leave alone stack elements that belong to higher layers. Where a DC does require a stack element, the DC will typically require all stack elements above it.

Figure 4:
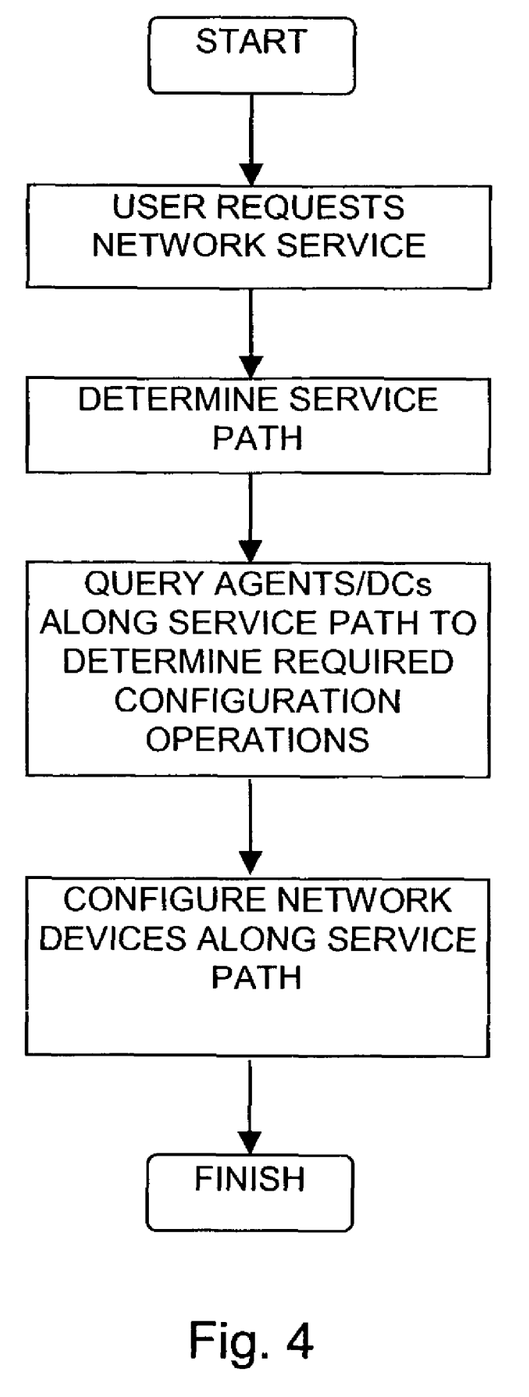
FIG. 4 is a simplified flowchart illustration of a method of network provisioning in a distributed network management architecture, operative in accordance with a preferred embodiment of the present invention.

Reference is now made to FIG. 4, which is a simplified flowchart illustration of a method for network provisioning in a distributed network management architecture, operative in accordance with a preferred embodiment of the present invention. By way of example, when a user requests a new network service, the network elements that need to be configured to support the new service must be identified, and how each network element should be configured must be determined. Often, service requests are for path-related services, i.e., service requests that can be fulfilled by configuring a chain of connected devices that lie along the path between two points on the network, such as the service requester and the service provider. Examples of path-related services include the establishment of virtual circuits in an ATM network and providing Internet access in a DSL network. Thus, in order to identify the network elements that need to be configured, the service path must first be determined. A preferred method for path discovery is described in greater detail hereinbelow with reference to FIG. 5.

Once the path is determined and the network device or devices corresponding to the DCs along the path are known, the agents/DCs representing the network devices are queried in order to determine what configuration operations are required in each network device to provision the service request. As the configuration operations needed in a network device may depend on the configuration operations of its neighboring devices in the path, this may be done in any of the following ways:

1. Sequentially determine the required configuration operations of each network device, and pass this information from one agent to the next.

2. Determine in one phase the required configuration operations of every other (i.e., every odd or every even) network device along the path, pass this information from one agent to the next, and then determine in the next phase the required configuration operations of the remaining network devices along the path.

3. Implement known network device configuration negotiation protocols between each network device agent and its neighboring agents.

Finally, once the required configuration operations have been determined, the actual network devices along the path are so configured. A preferred method for network device configuration is described in greater detail hereinbelow with reference to FIG. 6.

Reference is now made to FIG. 5, which is a pseudocode description of a method for path discovery in a distributed network management architecture, operative in accordance with a preferred embodiment of the present invention. In the present invention every agent and/or DC is capable of computing a weight function for each of its outgoing links to other agents/DCs. The weight function quantifies the desirability, typically as a non-negative cost, of satisfying a given provisioning request by establishing the path traverse via any of the outgoing links. Thus, finding a path in the network between two endpoints may be reduced to the finding the path that has the greatest cumulative desirability, such as the path that has the lowest cumulative cost.

In the method of FIG. 5 a source DC, such as the DC that represents the network device component that is closest to the service requester, broadcasts to each of its neighbors via its outgoing links a path discovery request together with the weight of its outgoing link to the neighbor. The first time a DC receives a particular path discovery request, it establishes the requesting DC as the current parent DC. Each time a DC establishes its current parent DC, it sends a new path discovery request to each of its neighbors via its outgoing links, along with the weight received from the current parent DC added to the weight of the outgoing link. The weight thus represents the source-to-current-DC cumulative weight.

When a DC receives a new path discovery request from another DC via an incoming link, it compares the weight received from the current parent DC to the newly-received weight. If the current parent's weight is less than or equal to the newly-received weight, then the parent DC remains as such, and the DC sends the currently requesting DC a response signal. However, if the current parent's weight is greater than the newly-received weight, then the DC sends the current parent DC a response signal, and the currently requesting DC becomes the current parent DC.

Each path discovery request typically includes an identifier of the destination DC unless the destination DC "knows" in advance that it is the destination DC. When the destination DC receives a path discovery request from another DC via an incoming link, it sends the requesting DC a path termination signal together with its identifier, as well as a response signal.

The first time a DC receives a path termination signal together with a list of one or more identifiers representing a path of DCs from the destination DC to the current DC and either the weights of the links that lie along the path or the cumulative weight of the links, it establishes the path as the current best-path candidate. Thereafter, when the DC receives a new path termination signal, it compares the cumulative weight of the links that lie along the current best-path candidate to the cumulative weight of the links of the newly-received list. If the current best-path candidate's cumulative weight is less than or equal to the newly-received cumulative weight, then the current best-path candidate remains as such. However, if the current best-path candidate's cumulative weight is greater than the newly-received cumulative weight, then the DC establishes the path represented by the newly-received list as the current best-path candidate.

Once a DC has received a response signal for each path discovery request that it sent, has a current parent DC, and has a current best-path candidate, it sends its current parent DC a path termination signal together with its identifier prepended to its current best-path candidate list, as well as a response signal. The DC also preferably clears any path lists and other variables used during the path discovery process. Propagation of path termination signals continue in this manner until the source DC has received a response signal for each path discovery request that it sent, at which point its current best-path candidate is established as the most desirable path between the source DC and the destination DC.

Figure 6:
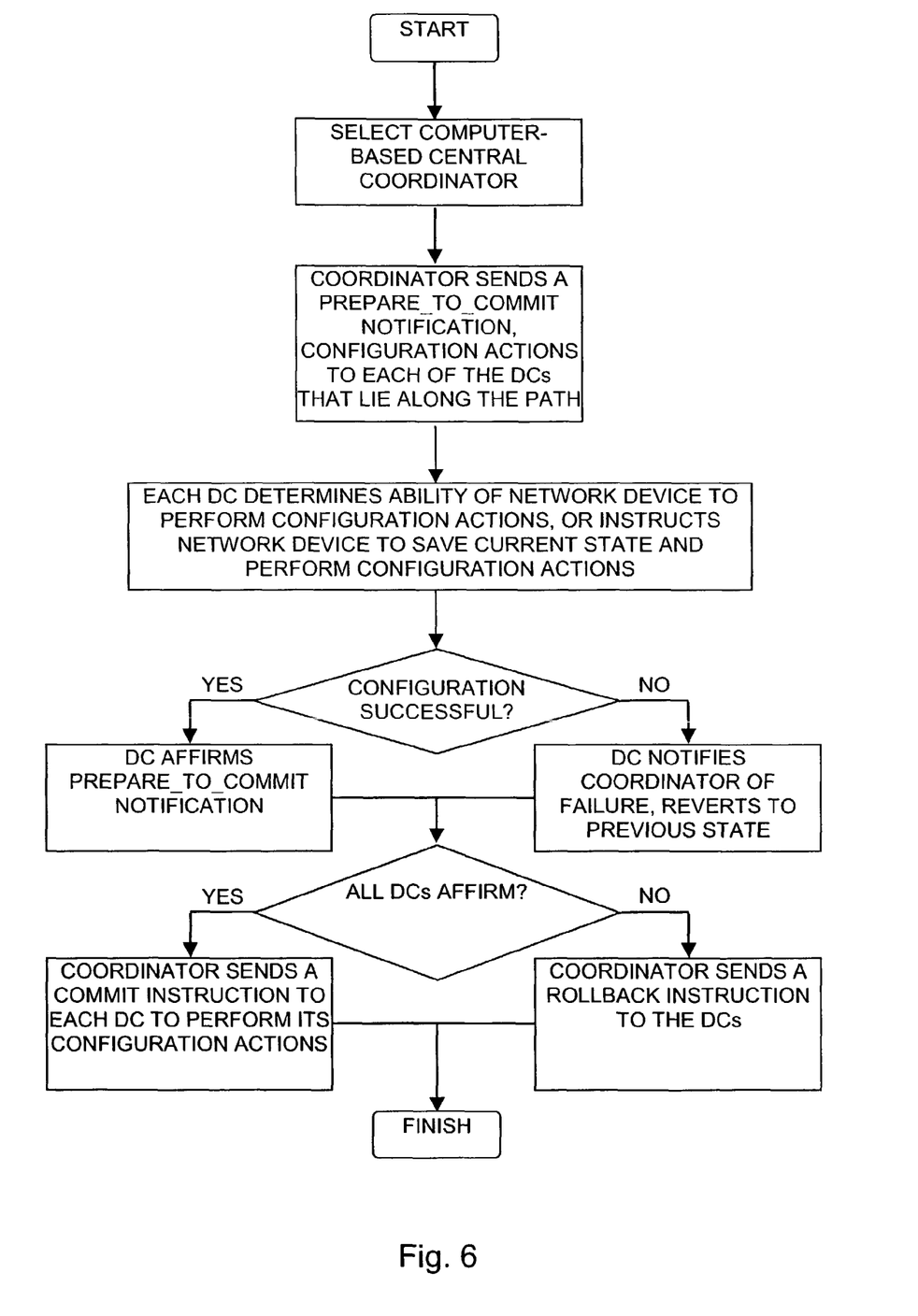
FIG. 6 is a simplified flowchart illustration of a method for network device configuration, operative in accordance with a preferred embodiment of the present invention.

Reference is now made to FIG. 6, which is a simplified flowchart illustration of a method for network device configuration, operative in accordance with a preferred embodiment of the present invention. In the method of FIG. 6, a computer-based central coordinator is selected, being, for example, as any one of the agents that lies along the identified path between the source DC and destination DC. The coordinator then sends a prepare_to_commit notification to each of the DCs that lie along the path, indicating the specific configuration actions that the network device corresponding to the DC is to perform as part of the provisioning operation. Each DC then responds to the coordinator, indicating whether or not the device is able to carry out the configuration actions. If all the DCs respond affirmatively, the coordinator sends a commit instruction to each of the DCs to perform the required configuration actions.

If one or more DCs does not respond to the prepare_to_commit notification within a predetermined time from sending said prepare_to_commit notification, or if one or more DCs indicates that its underlying device cannot carry out its required configuration actions, the coordinator may send a rollback instruction to the DCs canceling the provisioning operation.

Upon receiving a prepare_to_commit notification, the DC may determine whether its associated network device may perform its required configuration actions. Alternatively, the DC may instruct its associated network device to perform the configuration actions while saving its state prior to performing the configuration actions in the DCs memory and/or the network device's memory. Then, if the configuration succeeds, the network device may notify the DC of its success. Otherwise, if one or more configuration actions fails, the network device may notify the DC that it cannot carry out its required configuration actions. The network device may then revert back to its previous state.

Upon receiving a rollback instruction, the DC instructs its associated network device to revert to its previous state where the network device actually carried out the configuration actions. Upon receiving a commit instruction, the DC instructs its associated network device to erase its previous state information from memory where state information was stored in its memory.

It is appreciated that one or more of the steps of any of the methods described herein may be omitted or carried out in a different order than that shown, without departing from the true spirit and scope of the invention.

While the present invention as disclosed herein may or may not have been described with reference to specific hardware or software, the present invention has been described in a manner sufficient to enable those skilled in the art to readily adapt commercially available hardware and software as may be needed to reduce any of the embodiments of the present invention to practice without undue experimentation and using conventional techniques.

In one embodiment, the network management platform is comprised of many autonomous software agents, one per managed network device. The software agents execute on dedicated CPU machines (typically hundreds of agents per machine) and communicate with each other by passing messages over a dedicated management WAN. The CPU machines are strategically placed in proximity to network devices and connect to them through a LAN. Every software agent communicates with its associated network device by sending and receiving SNMP or Telnet commands over the LAN. In general, a software agent logically represents its associated device and therefore continuously samples it to detect changes. Network links are represented by an acquaintance relationship among the agents. Every agent manages a list of acquaintances, where two agents are considered acquaintances if their associated network devices are connected to each other by a network link.

In this embodiment, every software agent is further divided into logical components, where each logical component represents some distinct aspect of the hardware or software of the device, which we refer to as physical entities. Examples of physical entities are Ethernet ports, IP routing entities, and 1483 encapsulation implementations. Components can be logically linked to other components in the same agent or in other agents, thus creating a global distributed graph of linked components.

The knowledge necessary for managing the communication network is distributed among the components, where each component is responsible for its associated physical entity. It is the responsibility of the logical component to react to changes in the state of its associated entity. Likewise, a physical entity is only configured by its logical component. Network wide operations are implemented by the exchange of messages between the various components, where distributed algorithms are used to decide which messages are sent and by which components. It is assumed the components can communicate with their neighbors.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer implemented method, comprising:
   receiving a new service request, wherein the new service request includes a request for a particular service to be provisioned on a network;
   in response to receiving the new service request, determining a provisioning path, wherein the provisioning path includes one or more network devices to be configured to satisfy the new service request;
   determining a set of device components along the provisioning path, wherein each of the device components represents an entity, wherein an entity is a physical or logical aspect of a network device;
   wherein each device component is part of an autonomous agent, wherein each autonomous agent is comprised of one or more device components and represents an associated network device;
   wherein the set of device components comprises a first device component that is part of a first autonomous agent and a second device component that is part of a second autonomous agent;
   selecting a central coordinator agent to coordinate configuration changes, wherein the configuration changes are based on the new service request, wherein the central coordinator agent coordinates the configuration changes by performing the steps of:
      instructing the first device component to: a) save first state information associated with a first entity of a first network device; and b) instruct the first network device to perform a first configuration action upon the first entity, wherein the first configuration action is based at least in part on the configuration changes;
      instructing the second device component to: a) save second state information associated with a second entity of a second network device; and b) instruct the second network device to perform a second configuration action upon the second entity, wherein the second configuration action is based at least in part on the configuration changes;
      receiving a first response from the first device component, wherein the first response indicates that the first configuration action was successful or that the first configuration action could not be carried out;
      receiving a second response from the second device component, wherein the second response indicates that the second configuration action was successful or that the second configuration action could not be carried out;
      upon determining that the first and second configuration actions were successful, instructing the first and second device components to cause the first and second state information to be erased;
      upon determining that the first and second configuration actions could not be carried out, instructing the first and second device components to cause the first and second entities to revert to a saved state;
   wherein the method is performed by one or more computing devices.

2. The method of claim 1, further comprising said device components instructing their associated network devices to revert to their previous state.

3. The method of claim 1, further comprising causing said first and second entities to revert to a saved state if any of said responses are not received within a predetermined amount of time.

4. The method of claim 1, further comprising:
   any of said device components instructing its associated network device to perform said configuration actions;
   if said configuration actions succeed, said network device notifying its associated device component of said success; and
   if said configuration actions do not succeed, said network device notifying its associated device component of said failure and said network device reverting back to its previous state.

5. The method of claim 4, wherein said saving step comprises saving said state in a memory of said network device.

6. The method of claim 4, wherein said saving step comprises saving said state in a memory of said device component.

7. A computer-readable non-transitory storage medium storing instructions which, when executed by one or more processors, cause the one or more processors to perform:
   receiving a new service request, wherein the new service request includes a request for a particular service to be provisioned on a network;
   in response to receiving the new service request, determining a provisioning path, wherein the provisioning path includes one or more network devices to be configured to satisfy the new service request;
   determining a set of device components along the provisioning path, wherein each of the device components represents an entity, wherein an entity is a physical or logical aspect of a network device;

wherein each device component is part of an autonomous agent, wherein each autonomous agent is comprised of one or more device components and represents an associated network device;

wherein the set of device components comprises a first device component that is part of a first autonomous agent and a second device component that is part of a second autonomous agent;

selecting a central coordinator agent to coordinate configuration changes, wherein the configuration changes are based on the new service request, wherein the central coordinator agent coordinates the configuration changes by performing the steps of:

instructing the first device component to: a) save first state information associated with a first entity of a first network device; and b) instruct the first network device to perform a first configuration action upon the first entity, wherein the first configuration action is based at least in part on the configuration changes;

instructing the second device component to: a) save second state information associated with a second entity of a second network device; and b) instruct the second network device to perform a second configuration action upon the second entity, wherein the second configuration action is based at least in part on the configuration changes;

receiving a first response from the first device component, wherein the first response indicates that the first configuration action was successful or that the first configuration action could not be carried out;

receiving a second response from the second device component, wherein the second response indicates that the second configuration action was successful or that the second configuration action could not be carried out;

upon determining that the first and second configuration actions were successful, instructing the first and second device components to cause the first and second state information to be erased;

upon determining that the first and second configuration actions could not be carried out, instructing the first and second device components to cause the first and second entities to revert to a saved state.

8. The computer-readable non-transitory storage medium of claim 7, wherein the instructions further include instructions for said device components instructing their associated network devices to revert to their previous state.

9. The computer-readable non-transitory storage medium of claim 7, wherein the instructions further include instructions for causing said first and second entities to revert to a saved state if any of said responses are not received within a predetermined amount of time.

10. The computer-readable non-transitory storage medium of claim 7, wherein the instructions further include instructions for:

any of said device components instructing its associated network device to perform said configuration actions;

if said configuration actions succeed, said network device notifying its associated device component of said success; and if said configuration actions do not succeed, said network device notifying its associated device component of said failure and said network device reverting back to its previous state.

11. The computer-readable non-transitory storage medium of claim 10, wherein said saving step comprises saving said state in a memory of said network device.

12. The computer-readable non-transitory storage medium of claim 10, wherein said saving step comprises saving said state in a memory of said device component.

* * * * *